Nov. 18, 1969  W. G. DUKEK ET AL  3,478,578
DEVICE FOR MEASURING THE EFFECT OF SURFACE ACTIVE MATERIALS
ON EMULSIFIED WATER RETENTION BY JET FUELS
Filed May 15, 1967

W. G. Dukek
B. R. Wakeford   INVENTORS

BY Donald F. Wohlers
PATENT ATTORNEY

United States Patent Office 3,478,578
Patented Nov. 18, 1969

3,478,578
DEVICE FOR MEASURING THE EFFECT OF SUR-
FACE ACTIVE MATERIALS ON EMULSIFIED
WATER RETENTION BY JET FUELS
William G. Dukek, Summit, and Brian R. Wakeford,
Kendall Park, N.J., assignors to Esso Research and
Engineering Company, a corporation of Delaware
Filed May 15, 1967, Ser. No. 638,441
Int. Cl. G01n 11/00, 21/26
U.S. Cl. 73—61.1                    5 Claims

ABSTRACT OF THE DISCLOSURE

In an apparatus for determining the ability of a petroleum based fuel to shed water, a known quantity of water is ultrasonically emulsified in a sample of the fuel to be tested. The water-fuel emulsion is then partially coalesced and the turbidity of the emulsion is measured, the result being indicative of the fuel's ability to shed water.

This invention relates to the analysis of fuel mixtures. More particularly, it relates to a method and apparatus for detecting and measuring surface-active materials in petroleum derived fuels. The teachings of the instant invention are especially useful in determining the presence of surface-active materials in fuels to be used in jet aircraft. It is to be realized that even small quantities of these materials in jet fuel may often prove disastrous in that they tend to emulsify water which, at high altitudes, may readily freeze. The resulting ice may clog the fuel filters of a jet aircraft and cause a sudden stoppage of substantially all of the aircraft's power. Similarly, other impurities may be likewise dispersed in the fuel and result in similar operational difficulites.

Since surfactants in jet fuels can be troublesome, when present in concentrations even below 1 p.p.m., and furthermore since many different chemical varieties of surfactants may be present, it is not possible to measure fuel surfactancy by direct chemical means. Tests which are based on a determination of the electrical properties of a jet fuel are sometimes affected differently by the various chemical species of surfactants which may be present in the fuel. Furthermore, tests for properties such as dielectric constant do not lend themselves to field application. In the past, the better tests determining low concentrations of surfactants in fuels have thus relied on some process that magnifies the effect of the surfactants present. Two such methods used to give such a magnification whereby a quantitative measurement becomes possible are (1) concentration of the surfactants by leaching with water and (2) formation of a water haze by emulsification. Forming a haze magnifies the effect of a low surfactant concentration, since an optically dense water-in-fuel emulsion can be stabilized by a very low concentration of surfactant (~1 p.p.m.).

In the light of the above, it is to be appreciated that in the past various devices and methods have been put forth for determining jet fuel surfactancy. Of these, the so-called Water Separometer Index Modified (WSIM) test is the one accepted throughout the oil industry as the standard method for determining the surfactancy of jet fuels. This test, based on the haze formation principle discussed above, measures the ability of a jet fuel to shed emulsified water. The test is carried out with a water separometer of the type recommended by the Group on Water Separation Characteristics of Aviation Turbine Fuels of the Coordinating Research Council. This procedure is also detailed in A.S.T.M. procedure D–2550. In this test a water-fuel emulsion is formed in the apparatus, which contains a pressurized recirculation loop and emulsifying valve, by injecting a known quantity of water into a fuel sample circulating under pressure in the loop. The emulsion is then metered through a standardized coalescer and the effluent is then analyzed for entrained water by light transmission. Results are reported on a 0 to 100 scale. High ratings indicate fuels that are clean relative to surfactant materials and, consequently, fuels that release dispersed or emulsified water with ease.

Despite the fact that the WSIM test is the recognized industry standard, its operation is attended with several principal disadvantages. Among these are the high degree of care required in cleansing the apparatus before a test and the considerable time required to complete this cleaning process. Consequently, only 5–6 tests can be run in the course of a normal working day. Another disadvantage is that the WSIM test equipment is too large and heavy to be portable and is, therefore, not suitable for use in the field. Even if the size and weight of present WSIM apparatus could be reduced to the point where it could be carried by one man, the high degree of operator care needed to run the test would remain as a primary reason why the WSIM instrument could not be used in the field. Thus, the need for a fuel surfactancy analyzer, which is capable of use in the field, which does not require fastidious care on the part of the operator and which is capable of making many determinations per day is obvious.

According to the teachings of the instant invention, a device and method for achieving the above may be readily realized. Thus, in the preferred embodiment to be discussed in greater detail hereinafter, approximately 70 determinations can be made during the course of a normal working day. In addition, the device of the instant invention is portable and also eliminates the need for the careful cleaning operation between runs which accompanies the use of the WSIM test. Furthermore, the size of the fuel sample required is greatly reduced and the test results closely correlate with those obtained using the WSIM test equipment. According to a preferred embodiment, means are provided for introducing a fuel sample into a disposable plastic syringe. A small quantity of distilled water is then injected into the fuel sample. A fuel-water emulsion is then formed in the syringe by use of an ultrasonic oscillating probe, the probe being activated for a specified time period. The fuel-water emulsion is then transferred via a disposable tube and an automatic 3-way valve into another disposable syringe. This latter syringe is of the pumping type and effects the aforesaid transfer during its suction stroke. The plunger of this pumping syringe is activated by means driven by a reversible motor equipped with a variable speed device. Upon completion of the suction stroke and the associated transfer of the emulsified sample from the first syringe, the automatic 3-way valve shuts off the transfer line. The syringe plunger driving mechanism is then reversed and the emulsified sample is pushed through the 3-way valve and another tube which leads into a disposable filter-coalescer cell. Upon exit from this cell, a portion of the partially coalesced material is collected in a disposable glass vial and the turbidity of the material so collected is immediately determined by light transmittance in a turbidimeter or the like. The turbidimeter is previously adjusted to read 100% with a sample of the fuel under test and to read zero in the dark. Hence, the higher the value of percentage transmission obtained in the reported result from the turbidimeter, the higher is the freedom of the test fuel from surface-active agents. This follows due to the fact that the filter-coalescer cell serves to effect a partial breaking of the emulsion. The degree of success realized in the cell is a direct measure of the ability of the fuel under test to shed water. This in turn is inversely proportional to the concentration of surface-active agents present in the fuel. Where the ability to shed water decreases, due to a higher concentration of these agents, there will obviously be an increase in turbidity which will result in a lower value for percentage transmission.

It should be noted that the description above is of an illustrative nature only and, consequently, many changes may be made without departing from the spirit of the invention. For example, if the sample and pumping syringes are made to the same size, the transfer or the test fluid containing the emulsified water from the ultrasonic probe position to the pumping position can also be accomplished by merely transferring the sample emulsification syringe to the position of the pumping syringe after first inserting the plunger.

It is a principal object of this invention to provide a meaningful and practical method and apparatus for field test of jet-fuel surfactant concentration.

Another object of the invention is to provide a method and apparatus which produces results which correlate with WSIM test results.

It is a still further object to provide a method and apparatus whereby many samples may be tested during the course of a working day.

Further objects and advantages of the instant invention will be apparent from the following description, reference being made to the accompanying drawings herein.

Figure 1:
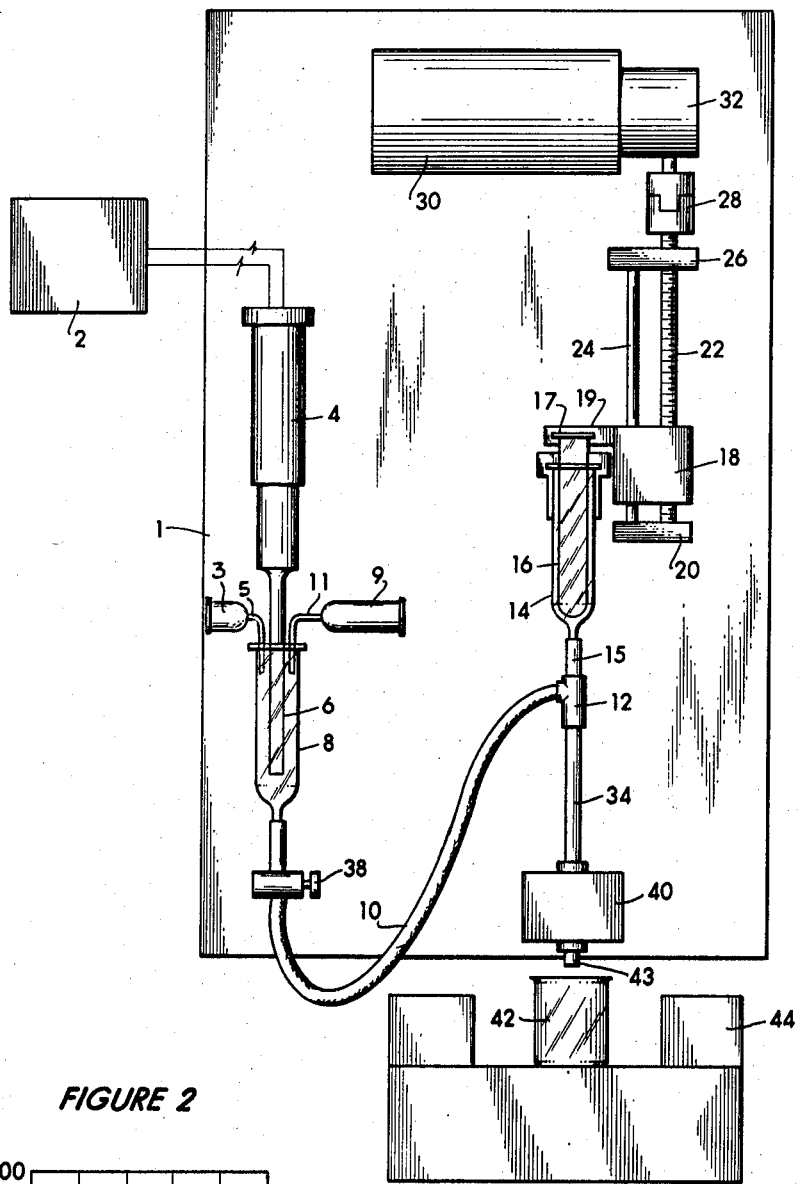
FIGURE 1 is a diagrammatic representation illustrating an apparatus embodying the teachings of the instant invention.

Referring to FIGURE 1 in detail, reference numeral 4 denotes an ultrasonic oscillator supported on a mounting plate 1. Oscillator 4, which drives probe 6, is supplied with energy from power source 2. Probe 6 is positioned within a disposable sample emulsifying container 8, which is also supported on plate 1. A suitable microsyringe, 9, is provided by means of which distilled water may be added to container 8 through the delivery tube 11. A second microsyringe 3 is provided by means of which a sample of the fuel to be tested is introduced into container 8 through a delivery tube 5. Container 8 is also provided with a disposable delivery tube 10. Tube 10, which is preferably made of a deformable plastic, is provided with a clamp 38. At its other extremity, tube 10 is connected to an automatic 3-way valve 12. One of the outlets of valve 12 communicates with a delivery tube 15 which in turn is connected to a pumping syringe 14, mounted in bracket 13. Pumping syringe 14, which is also preferably fabricated from a disposable plastic, is provided with a plunger 16, having a flange-like upper portion 17. Flange portion 17 is engageble by end 19 of driving member 18. Member 18 threadably engages the threaded portion of driving rod 22 and slidably engages guide rod 24. Rods 24 and 22 are supported by base member 20 and top member 26. Variable speed, reversible motor means 30 and its associated gear drive 32 are connected via connector 28 to threaded driving rod 22.

Referring once again to automatic 3-way valve 12, it may be seen that its other outlet communicates with tube 34. Tube 34 leads into a coalescer-impregnated glass-fiber filter means 40. Outlet 43 of coalescer 40 leads into a glass sample receiver 42 which is positioned within turbidimeter 44.

The apparatus may be employed as follows: A 50 mm. sample of the fuel to be tested is introduced into sample emulsifying container 8. Following this, 50 microliters of distilled water are introduced via microsyringe 9 and tube 11 below the surface of said sample at which time the ultrasonic oscillator 4 and its associated probe 6 are activated. The probe is activated for a fixed time for all determinations. The oscillation of the probe causes the formation of an emulsion between the injected water and the fuel under test. Applicants have found that when using a model S–75 Branson ultrasonic power source, the best correlations with the WSIM test are obtained when the probe is activated for a period of approximately 20 seconds.

Following the formation of the emulsion, clamp 38 is opened and the fuel-water emulsion is drawn through line 10 and the automatic 3-way valve 12 into the pumping syringe 14. This transfer is accomplished on the upstroke of syringe plunger 16, which as hereinbefore discussed is activated by driving member 18 in conjunction with drive 32 and motor 30. Upon completion of this transfer stroke, plunger 16 is then reversed and begins its down-stroke. This action closes valve 12 to line 10 and opens line 15 to line 34. It is to be appreciated that the efflux rate from syringe 14 is also kept constant for all determinations to insure uniformity in the test procedure. As plunger 16 continues its downward travel, the fuel-water emulsion is driven at a constant rate through the line 34 and the filter-coalescer 40. Coalescer 40 serves two functions. Firstly, to filter out any foreign bodies and, secondly, to partially coalesce the water particles. Upon the exit from coalescer 40, a portion of the partially coalesced fuel-water sample is collected in a disposable glass sample receiver 42. The percent light transmission of the sample is then determined as hereinbefore discussed.

By the using of the disposable items as hereinbefore detailed, applicants greatly simplify contamination and cleaning problems. This in turn allows many more determinations to be run in a single day than are possible using the WSIM test procedure.

Figure 2:
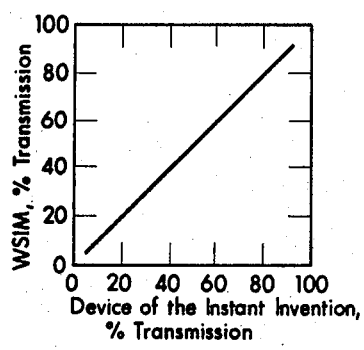
FIGURE 2 is a graph depicting the correlation between WSIM test results and those obtained using the apparatus and methods of the instant invention.

In reference to FIGURE 2, it is seen that the test results obtained utilizing the apparatus and methods of the instant invention are linearly proportional to those obtained using the WSIM apparatus and procedure. Hence, test results may easily be compared to, or put on the same basis of, WSIM results.

Although the above invention has been described with a certain degree of particularity, it will be understood that numerous changes in details and other modifications can be carried out without departing from the spirit of the invention.

What is claimed is:

1. An analyzer for determining the presence of surface-active agents in a petroleum fuel comprising in combination, ultrasonic means for emulsifying water in said fuel; means for partially coalescing the resultant emulsion; and means for determining the turbidity of the partially coalesced emulsion.

2. An analyzer which comprises in combination:
   (a) A sample vessel;
   (b) means for introducing a sample fluid and second fluid into said vessel, said second fluid being normally immiscible in said first fluid;
   (c) ultrasonic probe means disposed in said vessel;
   (d) a pumping syringe means;
   (e) transfer means whereby materials from said vessel may be transferred to and pumped from said syringe means;
   (f) coalescer-filter means disposed on the outlet of said syringe means; and
   (g) means for determining the turbidity of the material leaving said filter means.

3. The analyzer of claim 2 wherein said sample fluid is a jet fuel mixture and said second fluid is distilled water.

4. The analyzer of claim 3 further characterized in that said sample vessel, said transfer means, said pumping syringe and said coalescent-filter means are fabricated from plastic.

5. The apparatus of claim 2 wherein said coalescer filter means comprises a disposable plastic housing having inlet and outlet means and a resin-impregnated glass-fiber filter means disposed in said housing between said inlet and outlet means.

References Cited

UNITED STATES PATENTS 3,111,837  11/1963  Evans et al. _____ 73—61.1
3,271,998   9/1966  Topol _____ 73—61.1

LOUIS R. PRINCE, Primary Examiner
JOSEPH W. ROSKOS, Assistant Examiner

U.S. Cl. X.R.

356—208